United States Patent
Gur et al.

(10) Patent No.: US 11,017,258 B2
(45) Date of Patent: May 25, 2021

(54) ALIGNMENT OF USER INPUT ON A SCREEN

(71) Applicant: Microsoft Technology Licensing, LLC, Redmond, WA (US)

(72) Inventors: Arie Y. Gur, Kiryat Ono (IL); Amir Zyskind, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 277 days.

(21) Appl. No.: 16/000,868

(22) Filed: Jun. 5, 2018

(65) Prior Publication Data
US 2019/0370594 A1 Dec. 5, 2019

(51) Int. Cl.
*G06K 9/32* (2006.01)
*G06F 3/0484* (2013.01)

(52) U.S. Cl.
CPC ....... *G06K 9/3283* (2013.01); *G06F 3/04845* (2013.01)

(58) Field of Classification Search
CPC . G06K 9/3283; G06K 9/3275; G06F 3/04845
See application file for complete search history.

(56) References Cited

U.S. PATENT DOCUMENTS

| | | | | |
|---|---|---|---|---|
| 5,717,794 A * | 2/1998 | Koga | ................. | G06K 9/00442 382/177 |
| 6,671,417 B1 * | 12/2003 | Koshinaka | ........... | G06K 9/3283 382/254 |
| 7,039,234 B2 * | 5/2006 | Geidl | .................... | G06F 40/166 382/187 |
| 7,268,774 B2 | 9/2007 | Pittel et al. | | |
| 8,515,185 B2 * | 8/2013 | Lee | ........................ | G06K 9/036 382/229 |
| 8,520,983 B2 * | 8/2013 | Lee | ...................... | G06K 9/2081 382/293 |
| 8,730,244 B2 * | 5/2014 | Yamazaki | .......... | G01C 21/3673 345/467 |
| 8,942,484 B2 * | 1/2015 | Koo | ..................... | G06K 9/3258 382/181 |

(Continued)

FOREIGN PATENT DOCUMENTS

| | | |
|---|---|---|
| WO | 2013016016 A3 | 6/2013 |
| WO | 2016137845 A1 | 9/2016 |

OTHER PUBLICATIONS

"Set text direction and position in a shape or text box", Retrieved from: https://support.office.com/en-us/article/set-text-direction-and-position-in-a-shape-or-text-box-64d887b8-91b2-4293-8104-9d4a92a10fc8, Retrieved Date: Mar. 29, 2018, 14 Pages.

(Continued)

*Primary Examiner* — Manav Seth

(57) ABSTRACT

A system for automated user input alignment receives the user input at a touchscreen display. A skew of the user input is identified as the user input is being received at a touchscreen display. A skew correction is determined based on the identified skew. The skew correction is applied to the user input to align the user input on the touchscreen display. The skew correction applied in an automated alignment process that. The user input is displayed with the applied skew correction on the touchscreen display with improved efficiency and without user manipulation to perform the alignment.

20 Claims, 8 Drawing Sheets

(56) References Cited

U.S. PATENT DOCUMENTS

| | | | |
|---|---|---|---|
| 8,977,042 B2 | 3/2015 | Huo et al. | |
| 9,053,361 B2* | 6/2015 | Baheti | G06K 9/00456 |
| 9,235,748 B2* | 1/2016 | Mettyear | G06K 9/00865 |
| 9,619,052 B2* | 4/2017 | Bernstein | G06F 3/0416 |
| 9,746,944 B2* | 8/2017 | Gur | G06F 3/0383 |
| 9,772,697 B2* | 9/2017 | Gur | G06F 3/046 |
| 9,874,950 B2* | 1/2018 | Zhang | G06F 3/03545 |
| 10,176,395 B2* | 1/2019 | Abbas | H04N 1/3878 |
| 10,331,235 B2* | 6/2019 | Fleck | G06F 3/0346 |
| 10,514,844 B2* | 12/2019 | Seibert | G06F 3/0383 |
| 10,534,527 B2* | 1/2020 | Loftus | G06F 3/0485 |
| 10,614,330 B2* | 4/2020 | Joo | G06K 9/3275 |
| 2002/0031264 A1* | 3/2002 | Fujimoto | G06K 9/3283 382/199 |
| 2002/0179339 A1* | 12/2002 | Ely | G01D 5/208 178/18.07 |
| 2003/0160760 A1* | 8/2003 | Takakura | H04N 1/3876 345/158 |
| 2003/0210817 A1* | 11/2003 | Hullender | G06K 9/3283 382/187 |
| 2003/0215136 A1* | 11/2003 | Chao | G06K 9/3283 382/176 |
| 2004/0013318 A1* | 1/2004 | Simske | H04N 1/3878 382/289 |
| 2005/0041865 A1* | 2/2005 | Zhen | G06K 9/3283 382/187 |
| 2005/0094897 A1* | 5/2005 | Zuniga | G06K 9/3208 382/290 |
| 2005/0114788 A1 | 5/2005 | Fabritius | |
| 2006/0193518 A1* | 8/2006 | Dong | G06K 9/3283 382/186 |
| 2008/0317343 A1* | 12/2008 | Ferman | G06K 9/3208 382/176 |
| 2009/0115644 A1* | 5/2009 | Hsieh | G06F 3/0233 341/23 |
| 2010/0080461 A1* | 4/2010 | Ferman | G06K 9/3275 382/176 |
| 2010/0103463 A1* | 4/2010 | Joshi | H04N 1/32133 358/1.16 |
| 2011/0157236 A1* | 6/2011 | Inoue | G02B 27/017 345/689 |
| 2012/0106844 A1* | 5/2012 | Ramachandrula | G06K 9/3283 382/173 |
| 2012/0134588 A1* | 5/2012 | Zhang | G06K 9/3275 382/176 |
| 2012/0153026 A1* | 6/2012 | Bohn | G06F 3/03545 235/472.02 |
| 2013/0009907 A1* | 1/2013 | Rosenberg | G06F 3/046 345/174 |
| 2013/0058575 A1* | 3/2013 | Koo | G06K 9/4652 382/176 |
| 2013/0121589 A1* | 5/2013 | Gokturk | G06F 16/5846 382/195 |
| 2013/0194448 A1* | 8/2013 | Baheti | G06K 9/3258 348/222.1 |
| 2013/0195315 A1* | 8/2013 | Baheti | G06T 11/60 382/103 |
| 2013/0195360 A1* | 8/2013 | Krishna Kumar | G06K 9/32 382/182 |
| 2013/0195376 A1* | 8/2013 | Baheti | G06T 11/60 382/289 |
| 2013/0251249 A1* | 9/2013 | Huo | G06K 9/3283 382/161 |
| 2013/0314362 A1* | 11/2013 | Miyano | G06F 3/04883 345/173 |
| 2013/0335356 A1* | 12/2013 | Lee | G06K 9/2081 345/173 |
| 2014/0022406 A1* | 1/2014 | Baheti | G06K 9/3283 348/222.1 |
| 2014/0161365 A1* | 6/2014 | Acharya | G06K 9/3283 382/229 |
| 2014/0307973 A1* | 10/2014 | Young | G06K 9/40 382/200 |
| 2014/0313230 A1* | 10/2014 | Suggs | G09G 5/00 345/648 |
| 2015/0067489 A1* | 3/2015 | Zotto | G06F 3/04883 715/268 |
| 2015/0123923 A1* | 5/2015 | Stern | G06F 3/03545 345/173 |
| 2015/0193141 A1* | 7/2015 | Goldsmith | G06K 9/222 345/173 |
| 2015/0253889 A1* | 9/2015 | Hyun | G06F 3/04845 345/173 |
| 2015/0286293 A1* | 10/2015 | Gruhlke | G06F 3/03545 345/182 |
| 2015/0338949 A1* | 11/2015 | Westerman | G06F 3/0488 345/174 |
| 2015/0370350 A1 | 12/2015 | Hunt et al. | |
| 2016/0062491 A1 | 3/2016 | Shibata et al. | |
| 2016/0062634 A1* | 3/2016 | Kurita | G06F 3/017 715/268 |
| 2016/0098105 A1* | 4/2016 | Bell | G06F 3/044 345/179 |
| 2016/0125270 A1* | 5/2016 | Gokturk | G06F 3/0482 382/118 |
| 2016/0147723 A1* | 5/2016 | Lee | G06K 9/00402 715/268 |
| 2016/0210037 A1 | 7/2016 | Zhang et al. | |
| 2016/0266666 A1* | 9/2016 | Shah | G06F 3/03545 |
| 2016/0283786 A1* | 9/2016 | Imoto | G06K 9/00852 |
| 2016/0320895 A1* | 11/2016 | Ribeiro | G06F 3/0416 |
| 2016/0364027 A1* | 12/2016 | Bernstein | G06F 3/0482 |
| 2017/0060406 A1* | 3/2017 | Rucine | G06K 9/00402 |
| 2017/0091153 A1* | 3/2017 | Thimbleby | G06K 9/00402 |
| 2017/0104886 A1* | 4/2017 | Abbas | H04N 1/3878 |
| 2017/0161866 A1 | 6/2017 | Baudry et al. | |
| 2018/0024652 A1* | 1/2018 | Lin | G06F 3/0383 345/174 |
| 2018/0129307 A1* | 5/2018 | Ju | G06F 3/0416 |
| 2018/0136822 A1* | 5/2018 | Seibert | G06F 3/0416 |
| 2018/0143703 A1* | 5/2018 | Fleck | G06F 3/044 |
| 2018/0224952 A1* | 8/2018 | Nakaya | G06F 3/03545 |
| 2019/0033993 A1* | 1/2019 | Robinson | G06F 3/03545 |
| 2019/0042010 A1* | 2/2019 | Robinson | G06F 3/046 |
| 2019/0087026 A1* | 3/2019 | Bell | G06F 3/044 |
| 2019/0155895 A1* | 5/2019 | Buckley | G06K 9/00416 |
| 2019/0180415 A1* | 6/2019 | Lee | G06K 9/3275 |
| 2019/0204939 A1* | 7/2019 | Ju | G06F 3/03545 |
| 2019/0220109 A1* | 7/2019 | Bernstein | G06F 3/0482 |
| 2019/0302910 A1* | 10/2019 | Kim | G06F 3/038 |
| 2020/0058101 A1* | 2/2020 | Omori | G06T 3/60 |
| 2020/0064938 A1* | 2/2020 | Gray | G06F 3/0346 |
| 2020/0073490 A1* | 3/2020 | Bell | G06F 3/044 |

OTHER PUBLICATIONS

"International Search Report and Written Opinion Issued in PCT Application No. PCT/US2019/033635", dated Aug. 13, 2019, 13 Pages.

* cited by examiner

ALIGNMENT OF USER INPUT ON A SCREEN

BACKGROUND

Input of text or other characters using a digital device, such as a desktop touchscreen display or portable tablet device with a touchscreen display, is becoming more common. For example, a user can write directly on a touchscreen using a stylus pen or similar device. Because of the mechanics and position of a user's arm and hand when writing, particularly on a stationary touchscreen, the text is often not aligned with the screen, but instead is diagonal or otherwise skewed along the screen. For example, the touchscreen is often aligned vertically, while the natural writing motion of the user is slanted or diagonal. In some instances, because of visional convenience (eye position) it is easier for the user to write in this diagonal direction.

As a result, the writing input of the user is skewed from the orientation of the touchscreen, such that later viewing of the writing requires tilting of the touchscreen or movement of the user's head if horizontally aligned writing is desired. Thus, with conventional input mechanisms, the resulting writing from the user is not aligned with the touchscreen, which can be distracting from the content, such as when someone is later trying to read the text. For example, the text can be undesirably tilted within the touchscreen display.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for automated user input alignment comprises identifying a skew of a user input as the user input is being received at a touchscreen display and determining a skew correction based on the identified skew. The computerized method further comprises applying the skew correction to the user input to align the user input on the touchscreen display, wherein the skew correction is applied in an automated alignment process. The computerized method also includes displaying the user input with the applied skew correction on the touchscreen display.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

The computing devices and methods described herein are configured to align a user input (e.g., user writing on a touchscreen) with one or more axes of the display, such as a touchscreen display. For example, tilted or skewed text input on a touchscreen is automatically aligned with a horizontal axis of the touchscreen display in some examples, such as by autorotating the text or autorotating the application to align with the text. While performing the input, such as writing on the touchscreen, guidelines can also be generated to maintain the tilted writing by the user along a single axis. As a result, even when a user input on a display device is skewed, the end result is aligned to provide easier subsequent viewing without a user having to manually rotate the screen, either physically or virtually. A more efficient alignment process is thereby provided that improves the user experience. In this manner, when a processor is programmed to perform the operations described herein, the processor is used in an unconventional way, and allows for the more efficient alignment of the user input with the display.

Figure 1:
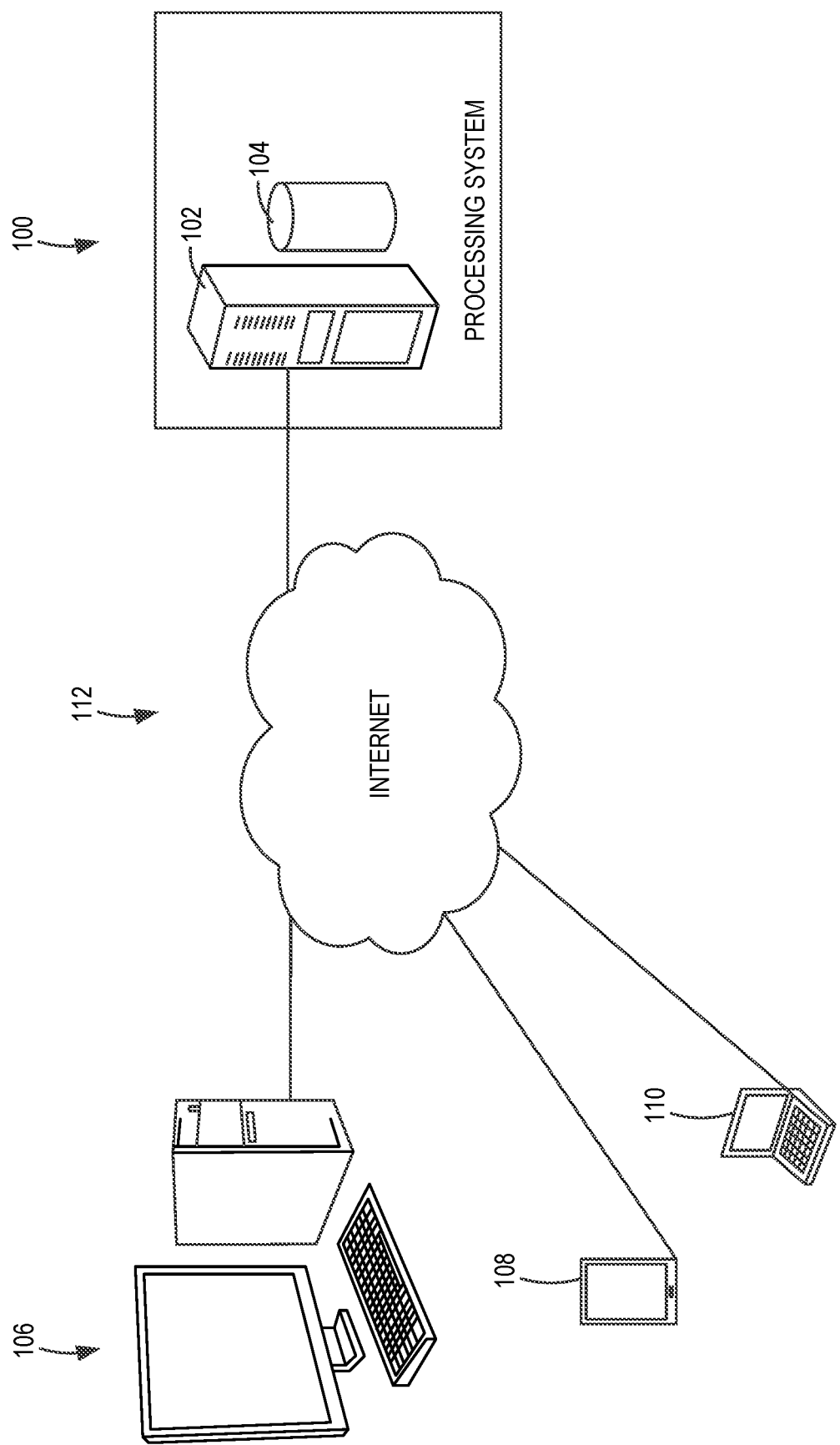
FIG. 1 is an exemplary block diagram illustrating a processing system according to an embodiment.

FIG. 1 is a schematic block diagram of a processing system 100 (e.g., an image processing system) deployed as a cloud service in this example. The processing system 100 includes one or more computers 102 and storage 104 to store user inputs (e.g., user writing on a displayed image) in some examples. It should be appreciated that other data, such as information to be displayed with the input can be stored in the storage 104 and processed by the one or more computers 102 using the present disclosure.

The processing system 100 is connected to one or more end user computing devices in some examples, such as a desktop computer 106, a smart phone 108 or a laptop computer 110, each having a touchscreen for receiving user input, such as with a stylus pen. For example, the processing system 100 is shown as connected to the end user computing devices via a computer network 112, illustrated as the Internet.

The processing system 100 receives the input data from an end user computing device. The data, in some examples, is skew corrected text or skew uncorrected text uploaded to the processing system 100. It should be appreciated that the input alignment processing of various examples and the functionality thereof is implemented within the end user computing devices. In some embodiments, alignment processing updates (e.g., updated versions of the alignment functionality) can be communicated from the processing system 100 to the end user computer device. Moreover, in some examples, the user input aligned in accordance with the present disclosure can be communicated to the processing system 100 and stored in the storage 104 for later access by one or more users. In other embodiments, the processing system 100 is configured to perform skew correction or additional skew correction on the uploaded data.

Figure 2:
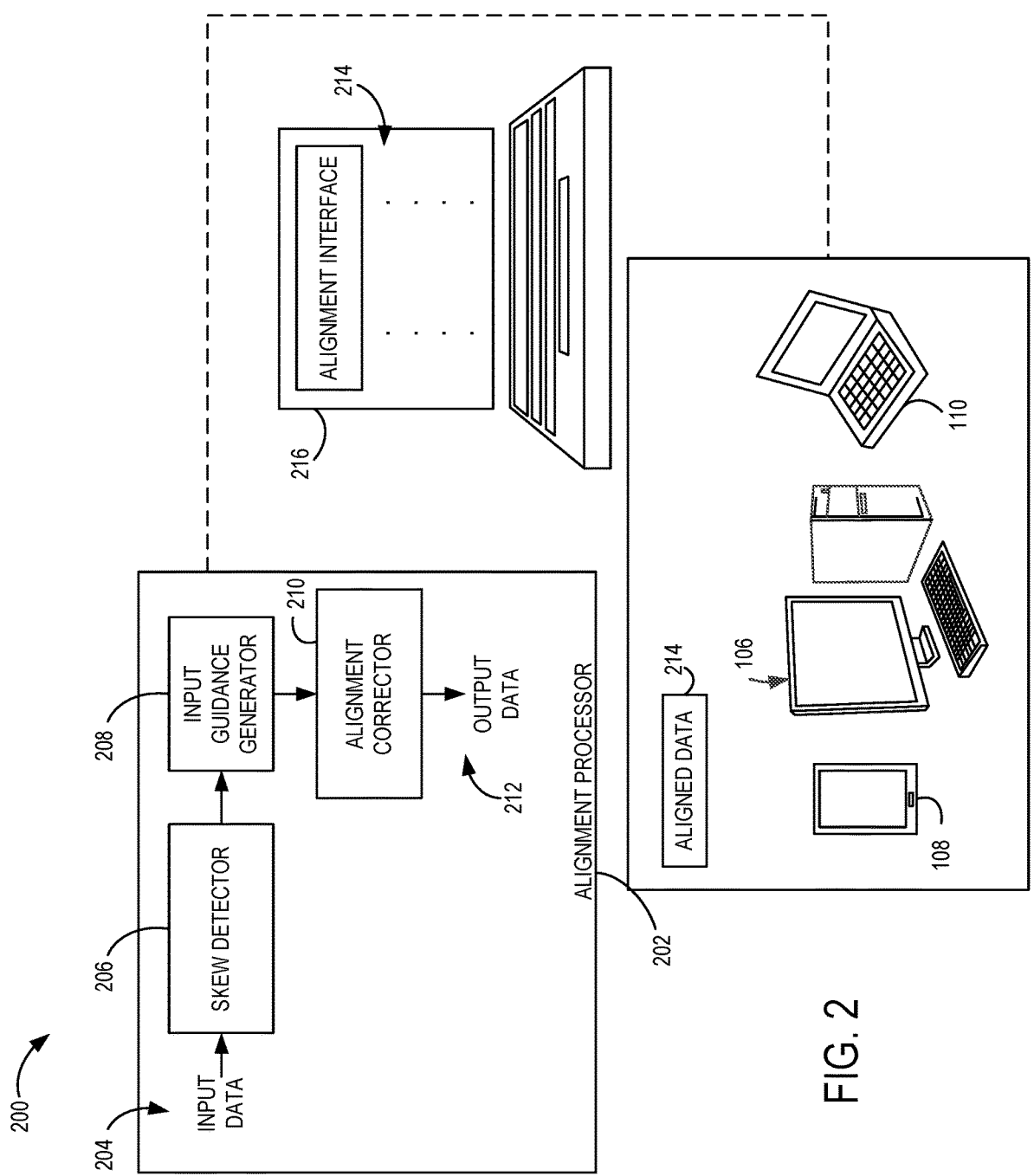
FIG. 2 is an exemplary schematic block diagram illustrating an alignment processor according to an embodiment.

Various examples include an input alignment system 200 as illustrated in FIG. 2. The input alignment system 200 in one example uses various methods to detect misaligned or skewed user inputs (e.g., tilted text) and automatically orients the text, such as by adjusting the text alignment to that of the display screen or adjusting the alignment of an application relative to the tilt of the text. The input alignment system 200 includes an alignment processor 202 that is configured in some examples as a text alignment engine that adjusts misaligned text input by the user. For example, when titled or otherwise skewed text (e.g., wavy text) is detected, the alignment processor 202 automatically adjusts the skew (e.g., tilt or rotation) of the text relative to one or more axes of the display (e.g., touchscreen display upon which the user is writing). Thus, the skew from the user's input is corrected to be aligned with the display screen, which in various examples is aligned with the display screen when positioned in a vertical (up-down) orientation (e.g., aligned along a horizontal axis of the screen).

Figure 3:
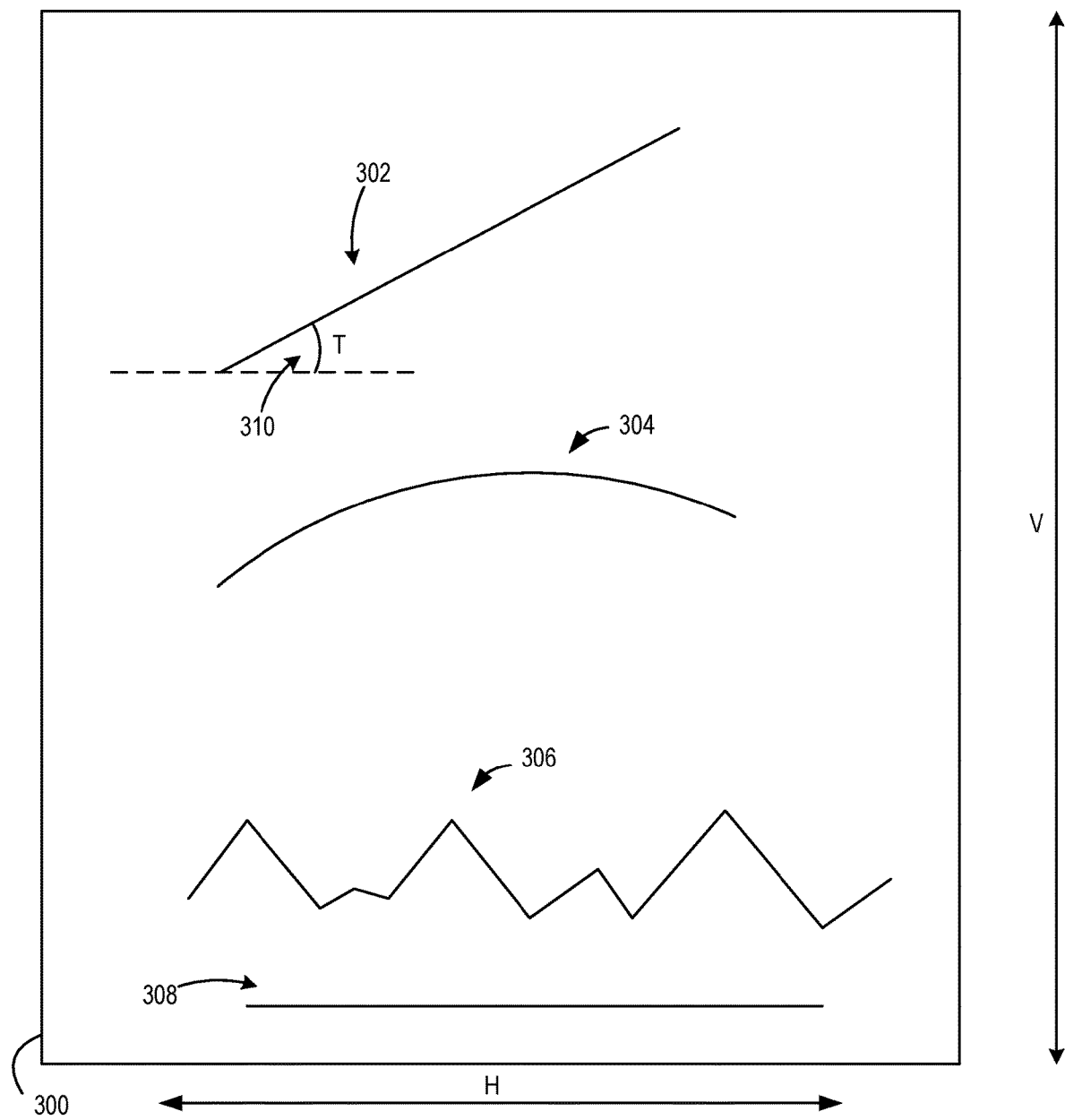
FIG. 3 illustrates different skews according to various embodiments.

The alignment processor 202 has access to input data 204, such as text or characters input by a user on a touchscreen display. In some examples, the input is skewed such as illustrated in FIG. 3. For example, a user input (e.g., writing) on a touchscreen 300 can be skewed with respect to the horizontal axis (H) of the touchscreen 300. This skewing can include different nonaligned text or input from the user, such as tilted text 302, curved text 304 (e.g., arcuate or rounded text) or wavy text 306. However, it should be appreciated that the present disclosure contemplates any non-aligned or skewed text input by the user. Moreover, different lines of text (or portions of each line of text) can have the same or different skewing.

Various examples align the skewed text with respect to the horizontal axis of the touchscreen 300, such as illustrated as aligned text 308. It should be noted that in some examples, depending on the orientation of the touchscreen 300 and/or a desired final viewing direction, the aligned text 308 can be aligned with a vertical axis (V) of the touchscreen 300. With the present disclosure, a user does not have to manually correct the tilt, such as by inputting a tilt angle (e.g., numerically or using a mouse pointer). Instead, and with reference again to FIG. 2, the alignment processor 202 automatically corrects the skewed input by an amount to remove the undesired skew. It should also be noted that the skewed text in some examples is aligned with the vertical axis of the touchscreen 300 (e.g., Japanese language characters).

Specifically, a type and amount of skew is detected using a skew detector 206. In some example, the skew detector 206 is performed using an optical character recognition (OCR) process that identifies any skewed inputs. This process can use any misalignment detection method in the OCR technology. As other examples, edge detection can be used to identify one or more edges of characters or other inputs and identify a difference in orientation relative to an expected orientation (e.g., an expected alignment or rotation of one or more letters). It should be noted this process can be performed on individual inputs, such as individual characters (e.g., letters) or for a group of inputs (e.g., one or more lines of characters).

The skew detector 206 in some examples is performed using any process that detects the direction of writing, hand and palm positions and/or user configuration. For example, OCR functionality is used to perform one or more of functions of the skew detector 206. Additionally, in some examples, the skew detection is performed using one or more sensors (e.g. mechanical sensors, electrical sensors, optical sensors, acoustic sensors, gyroscopic sensors, or a combination thereof, such as an orientation or tilt sensor) of the touchscreen device.

Figure 4:
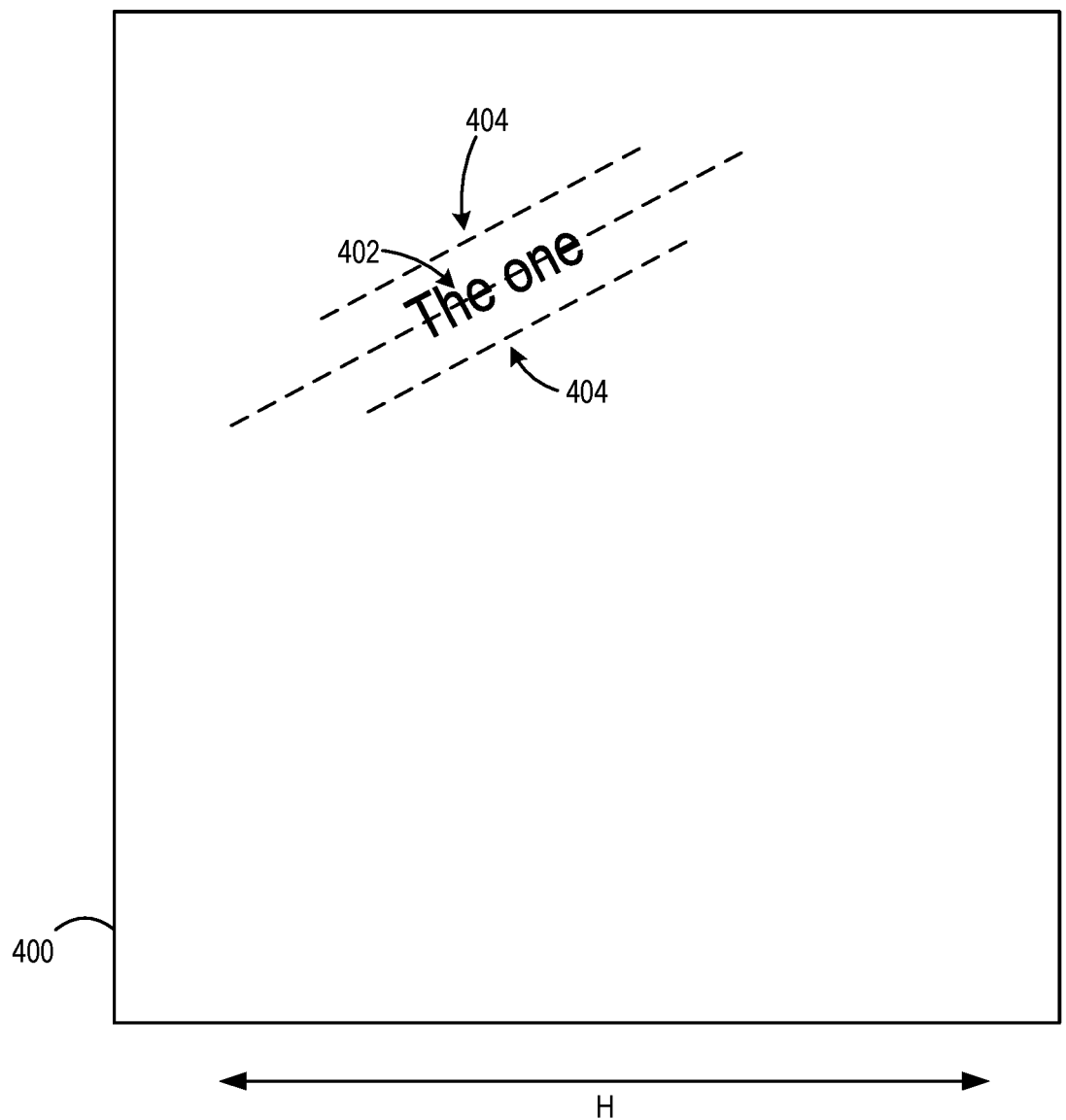
FIG. 4 illustrates guidance markers according to an embodiment.

The skew detector 206 uses an averaging process in some examples to identify an amount of skew for a group of inputs to identify an axis angle along which the skewed text is input. For example, as the user inputs the text, the skew detector 206 identifies a range of tilt for the text to determine a tilt axis along which the text is being input, which is defined by a tilt angle (T) 310 (shown in FIG. 3). The tilt axis is used by an input guidance generator 208 in some examples to generate guidelines of display as the user is inputting the text or other characters. In one example, the tilt axis identifies a hand writing direction of the user that is used by the input guidance generator 208, configured as a guideline generator, to display guidance markers, such as guidelines to align the skewed text along a single axis. For example, as illustrated in FIG. 4, when a user input, such as writing 402 (illustrated as letters) on a touchscreen 400 is skewed with respect to the touchscreen (e.g., angled with respect to a horizontal axis (H) of the touchscreen 400), one or more guidance markers 404 are displayed on the touchscreen 400.

In the illustrated example, the guidance markers 404 are lines, shown as dashed lines, above and below the writing 402. In should be noted that any type or configuration of guidance elements displayed on the touchscreen 400 can be used and can be spaced from the writing 402 at a different amount than shown. For example, a guidance line can be displayed above and/or below the writing 402 at a defined distance from the top and/or bottom of the writing 402 or from a center axis 406 of the writing 402. As a result, a user is better able to arrange his or her writing position, size, shape, etc., which facilitates a more efficient alignment process in some examples, wherein a tilting correction with respect to only a single axis is performed. It should be noted that the guidance markers 404 can be displayed for a defined time period and can be removed during or after the user is inputting the writing 404. In some examples, the user can turn on or off the guidance markers 404. Additionally, in some examples, the guidance markers 404 become part of the saved document that includes the writing 402.

With reference again to FIG. 2, an alignment corrector 210 is configured to align the input data 204 based at least in part on the skew detected by the skew detector 206. For example, with the skew detected, such as by tracking the writing direction of the input data 204, the skew is adjusted or removed to generate, as output data 212, aligned characters or text in some examples. The output data 212 is aligned in one example with the horizontal axis (H) of the touchscreen 300 or 400 (shown in FIGS. 3 and 4). The alignment corrector 210 in some examples can be a feature of the OCR functionality that aligns the skewed input data 204 with the touchscreen display.

In some examples, with the horizontal axis of the touchscreen being known (using defined display coordinates or pixel rows), the alignment corrector 210 adjusts the input data 204 to align along the horizontal axis. The adjustment can include any type of adjustment or movement that corrects for the skew, such as tilting, rotating or otherwise moving some or all of the input data 204 to align with the touchscreen display, namely to be displayed horizontally along the touchscreen display. As should be appreciated, with the guidance features of the present disclosure (such as illustrated in FIG. 4), the skew correction is more efficiently performed as alignment correction is performed with an input that is skewed along a single axis and not multiple axes or randomly (such as with wavy text). The output data 212 can then be stored for later viewing in proper alignment with the touchscreen display. For example, aligned data 214, such as horizontally aligned text is displayed on the desktop computer 106, the smart phone 108 or the laptop computer 110.

In some examples, the operator is able to control the alignment using an alignment interface 214 or other selection means that allows the user to select or define different alignment parameters, including whether the alignment is performed. In one example, user confirmation or selection of data to be aligned is received prior to performing alignment as described herein. Thus, a user is able to specify or confirm the alignment to be performed using a graphical user interface 216.

Thus, various examples track a writing direction and automatically align the user input with the display screen. As part of the alignment process, some examples generate guidance markers for the user input.

Figure 5:
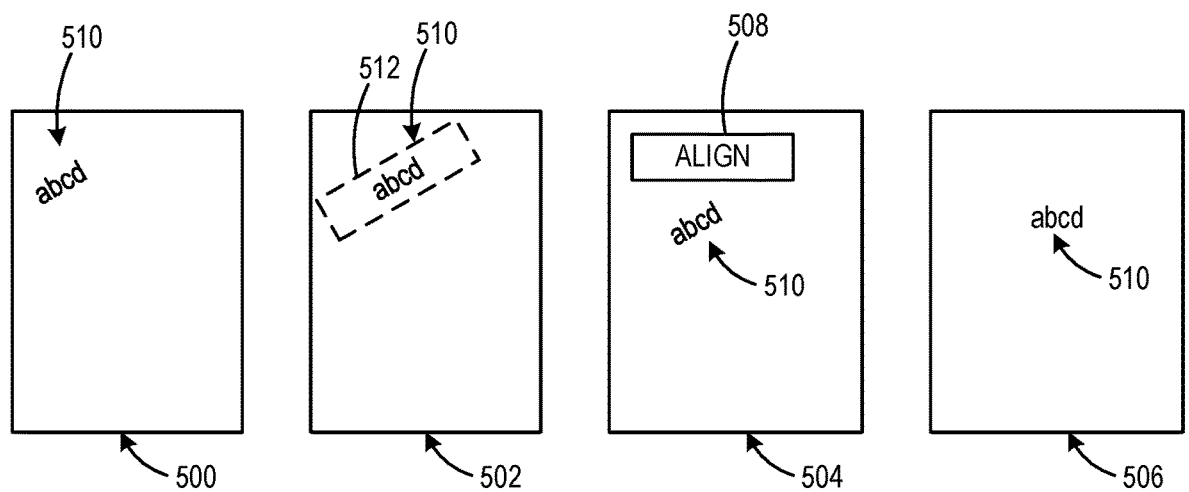
FIG. 5 illustrates skew correction according to various embodiments.

FIG. 5 illustrates different alignment processes and user inputs in accordance with some examples. For example, based on the detected hand writing direction of text 510 written by a user, such as on a touchscreen, the text 510 (which is tilted in this example) is aligned, which can be performed at the end of a line, at the end of a sentence, at the end of a phrase, at the end of a paragraph, etc. In one example, a fully automated skew correction process is performed as illustrated at 500 and 506. As can be seen, the text 510 that is tilted at 500 is aligned at 506 in a horizontal direction (e.g., along a horizontal axis of a touchscreen display). This process is performed automatically. That is, all text input to the touchscreen display is aligned without a user manually performing the adjustments.

As another example, a fully automated process with user confirmation is performed as illustrated at 500, 504 and 506. In this process, while the alignment of the text 510 to correct the skew is performed automatically at 500 and 506, a confirmation is received at 504 prior to proceeding with the skew correction. For example, a user input element 508 (such as an "ALIGN" button displayed on the touchscreen display) allows a user to select if and when the skew correction is performed. Thus, a user can decide whether skew correction is to be performed at all, and if it is to be performed, at what points or stages of the writing the skew correction is to be performed.

As another example, a manual selection process followed by automated skew correction is performed as illustrated at 500, 502 and 506. In this process, while the alignment of the text 510 to correct the skew is performed automatically at 500 and 506, user selection of the text 510 to be skew corrected is performed at 502. In the illustrated example, a user marks the text 510, such as with a box 512, to identify the text 510 to be skew corrected. For example, a user draws the box 512 around the text 510 or otherwise selects or highlights the text 510 to be skew corrected. Thus, a user can decide what portion of the input, such as what portion of the text 510 is to be skew corrected.

It should be noted that other combinations of the processes at 500, 502, 504 and 506 are contemplated by the present disclosure. For example, an automated alignment can be performed after a user selects the text 510 at 502 and also confirms that the alignment is to be performed at 504. It should also be noted that a user can select different language options to define the detection and alignment process in some examples, such as right to left or up/down languages. Also, the present disclosure can be implemented to correct skew in both left-handed and right-handed users, with the skew alignment being performed in different directions. That is, the tilt for left-handed and right-handed users is generally in opposite directions. Additionally, any type of skew correction can be performed, such as tilting, rotating, twisting, etc.

Figure 6:
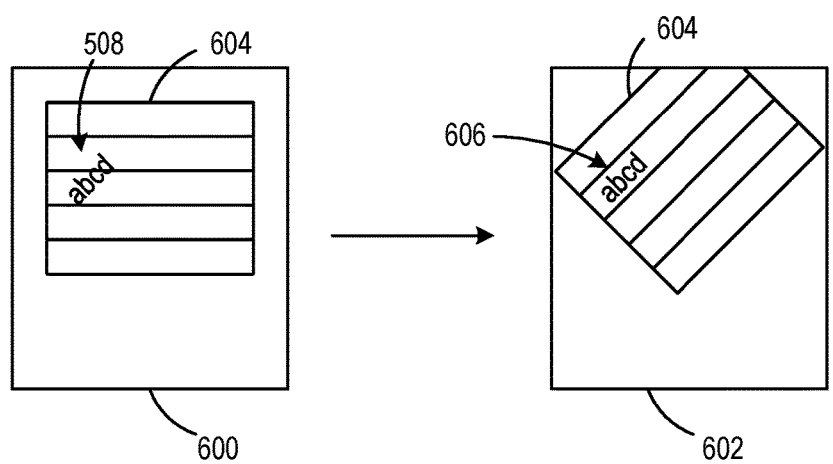
FIG. 6 illustrates skew correction according to other various embodiments.

Variations and modifications are contemplated. For example, an application, such as a spreadsheet being display as part of the application, can be rotated to perform the skew correction as illustrated in FIG. 6. As can be seen, skew detection and correction is performed as described herein, but in this example an application 604 is automatically rotated from the position at 600 to the position at 602 based on the detected tilt direction of text 606, such that the application 604 is tilted on the touchscreen display to align with the text 606. In one example, the application 604 rotation is an automated process similar to the text skew correction process described herein. Thus, at 602, the application 604 and text 606 are aligned along an axis of the application 604, which is skewed with respect to the display of the touchscreen. In this example, the application 604 is thereby aligned with the natural writing direction of the user.

Figure 7:
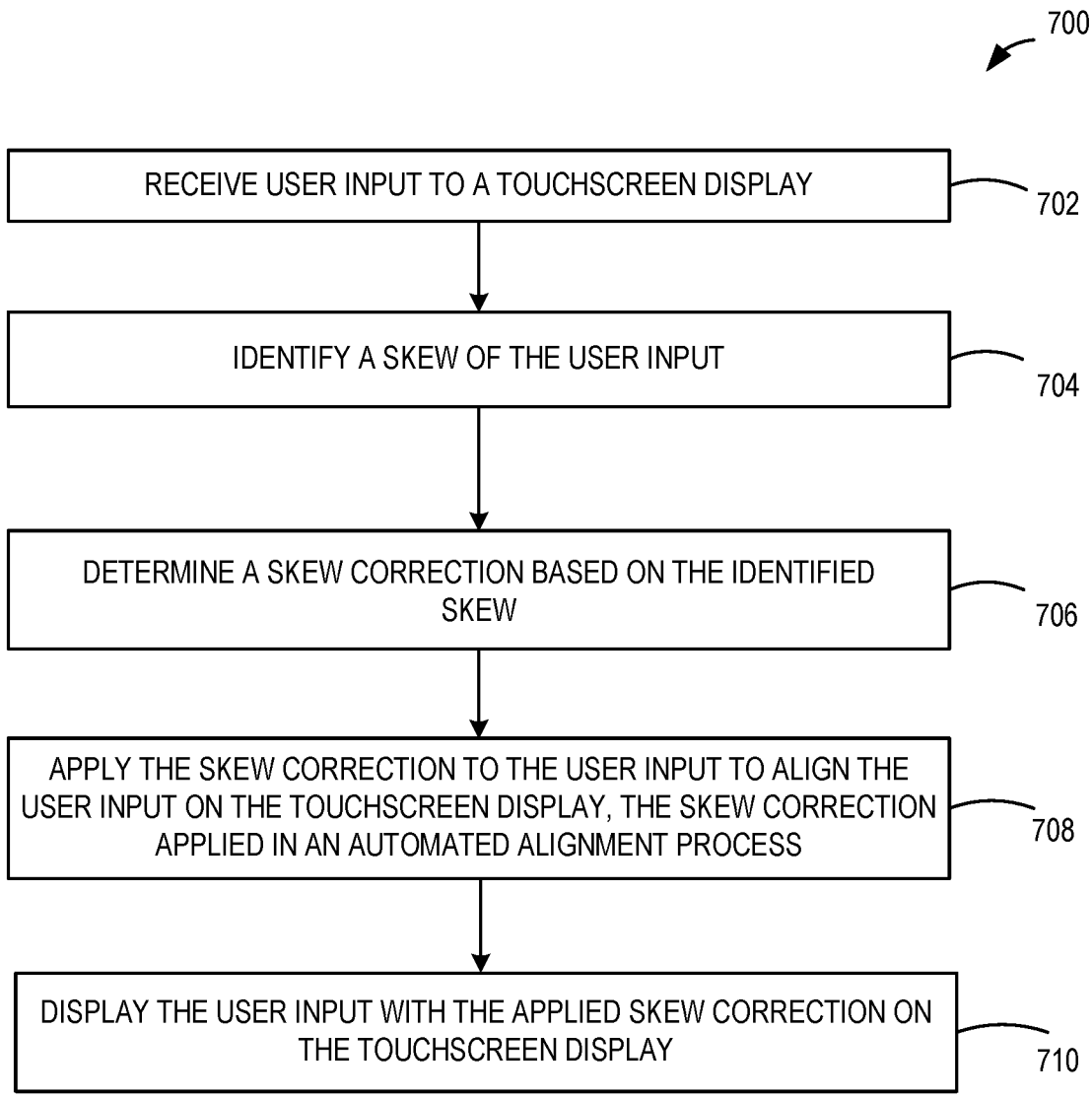
FIG. 7 is an exemplary flow chart illustrating operations of a computing device for user input alignment according to various embodiments.
Figure 8:
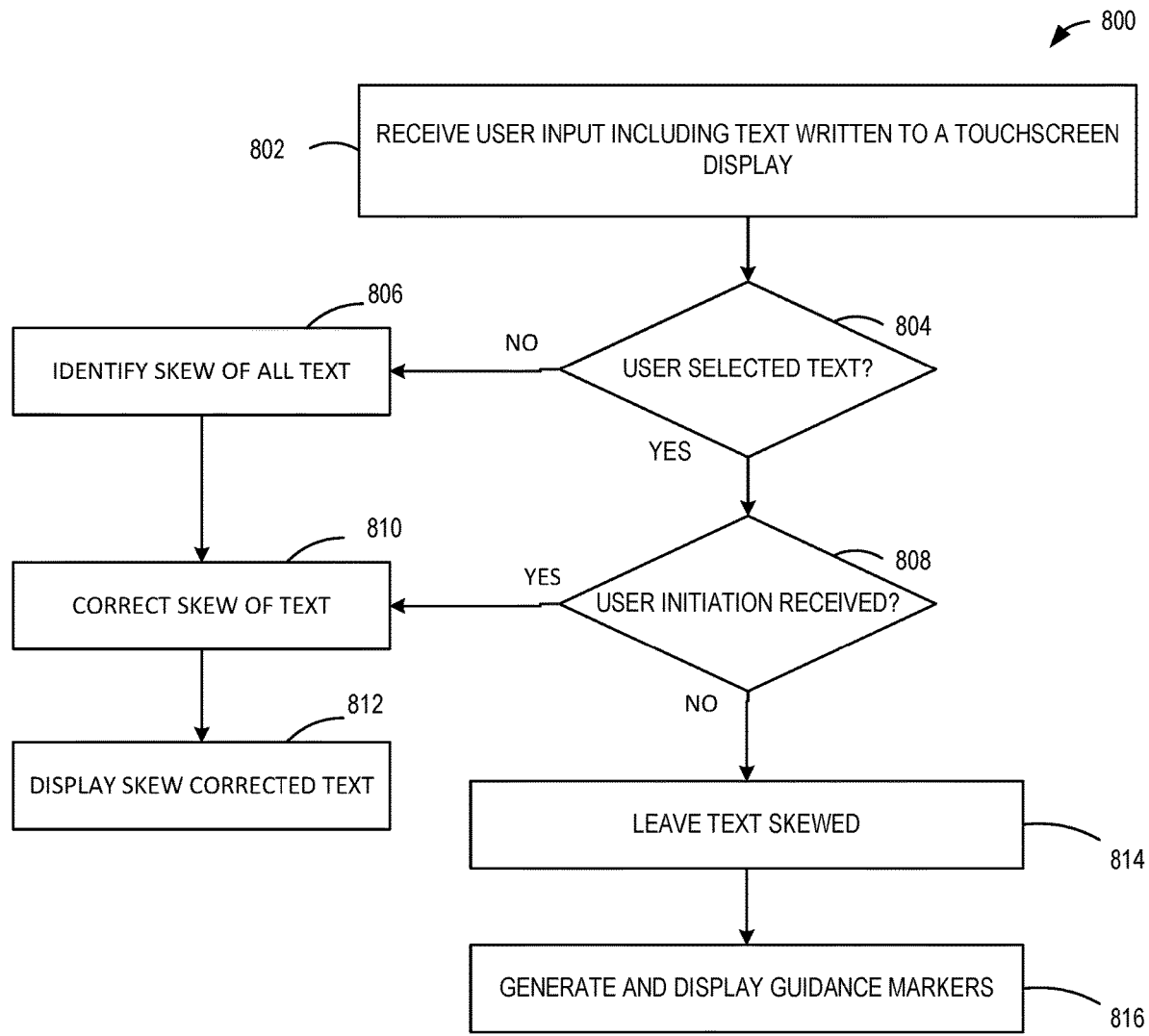
FIG. 8 is another exemplary flow chart illustrating operations of a computing device for user input alignment according to various embodiments.

Thus, various examples can be used to align skewed text or other user inputs to a display screen, such as a touchscreen display. FIGS. 7 and 8 illustrate exemplary flow charts of methods 700 and 800 for user input alignment. In particular, these figures are exemplary flow charts illustrating operations of a computing device to align a skewed user input, such as to a touchscreen display. The operations illustrated in the flow charts described herein can be performed in a different order than is shown, can include additional or fewer steps and can be modified as desired or needed. Additionally, one or more operations can be performed simultaneously, concurrently or sequentially.

With reference to the method 700, the computing device receives a user input at a touchscreen display at 702. For example, a user writes text on a touchscreen display using a stylus. The touchscreen display can be any type of display device that allows for touch operation. The touchscreen display can be free standing or form part of a portable computing device. In one example, a user inputs text to the touchscreen display, such as notes or annotations to displayed text or graphics. In some examples, the user can employ a writing functionality of an application to write characters using a finger, a digital pen, a stylus, a mouse or the like on a touch screen, a tablet or other display. Thus, the input in various examples can be active or passive, such as an active pen, a passive pen or a user's finger.

The computing device identifies a skew of the user input at 704. For example, an OCR program or a program using alignment detection technology identifies text or other input to the display by the user that is not aligned with the touchscreen, which in some embodiments includes texts that is tilted from the horizontal axis of the display. The computing device analyzes one or more different characteristics of the user input to determine the type and amount of skew. For example, a determination is made whether the skew is slanted or curved, and how much the skew deviates from a horizontal axis of the touchscreen display. In some examples, by identifying the display coordinates of, for example, the text being written by the user, the skew is determined. The skew detection can be performed using a process having a pre-defined model or parameters based on the different characteristics of the user input, such as font type, font size, font spacing, line spacing, etc.

The skew identification can be based on other factors. For example, user specific information can be used such as a writing trajectory of each stroke of each character to identify a pattern or direction of writing. By way of example, the trajectory information of a character may include, for example, temporal (e.g., timestamp) and spatial (e.g., coordinates) information of writing each stroke of the character. It should be noted that different skew identification processes may be used for different input types, such as based on the language of the text being written.

Using the identified skew, the computing device determines at skew correction at 706. For example, a determination is made to the amount of adjustment (e.g., tilting or rotation) to move the skewed text to be aligned with the horizontal axis of the touchscreen display. Thus, the computing device is configured to determine a correction value (e.g., rotation value or shift value) or component to apply to the displayed text to cause the displayed text to appear horizontally on the touchscreen display in some examples. The computing device, for example, can rotate or tilt one or more characters based on the skew for each character or for a complete line of characters. If an entire line of characters is to be rotated, a pivot or rotation point is determined at the beginning of the line (e.g., leftmost character) in some examples. If the characters in a single line have different rotations or tilts, a starting point, an ending point, a middle point, etc. of the characters can be used to define pivot or rotation points.

The computing device at 708 then applies the skew correction to the user input (e.g., line of characters) to align the user input on the touchscreen display. The skew correction in various examples is applied in an automated alignment process. For example, based on the skew correction determined at 706, the corresponding or equivalent rotation or tilt is applied to one or more characters to move the character(s) in alignment with the horizontal axis of the touchscreen display. For example, the computing device rotates one or more characters at a pivot point.

Additionally, in some examples, the character alignment with adjacent characters is also adjusted, such as in the case of "wavy" text. For example, one or more characters can be moved with respect to other characters to be in a predetermined or normalized direction or orientation, e.g., vertically downward (or upright) having a same lower end. The skew adjustment can be based on other features of the text, such as based on directions (or vectors) of the one or more strokes of the character. For example, a vector sum of the directions from starting points to ending points (or vice versa) of the one or more strokes of one or more characters is determined and the character(s) rotated or tilted to align the vector sum to a predetermined direction, e.g., vertically downward or upwards, horizontally from left to right or from right or left.

In some examples, the computing device, as part of the skew correction, scales one or more characters to a predetermined size. In one example, the computing device rescales a character based on an average height of characters within a line. However, other scaling can be used, such as based on a weight sum of the locations of tops and bottoms of the characters. The rescaling can be performed using any type of scaling method.

The computing device displays the user input with the applied skew correction on the touchscreen display at 710. For example, slanted text is moved to align across a horizontal axis of the touchscreen display. As such, reading of the text on a vertical (non-tilted) display is more easily accomplished.

It should be noted that the identification and correction of the skew can be based on fewer or more characteristic than described herein. For example, the feature set used to identify the skewed characters can be tuned to change the precision of the skew correction. Additionally, in some examples, the text to be skew corrected is text that is scanned and has a tilt as a result of the initial writing by the user or as a result of misalignment during the scanning operation.

With reference now to FIG. 8, a method 800 for user input alignment includes receiving a user input at 802. The user input in one example includes text written to a touchscreen display. The text can be input using a stylus or similar device as described herein. During the input, the text can become skewed as a result of the natural writing style of a person.

A determination is then made at 804 whether any text is selected by a user. For example, a determination is made whether a particular portion of text to have skew correction applied thereto has been selected (e.g., with a selection box). If no text is selected, then a skew of all text is identified at 806. It should be noted that in some examples, the text can already by aligned, in which case, no skew is detected. The skew detection is performed using skew or alignment processing techniques as described herein.

If some of the text is selected by the user, for example a portion of the text that is visibly skewed, then a determination is made at 808 whether a user initiation for skew correction is received. For example, a determination is made whether a user selects an alignment or skew correction feature from a user interface. If user initiation is received at 808 then the selected text is skew corrected at 810 as described herein (e.g., to align the text with the horizontal axis of the touchscreen display). Additionally, if all the text is analyzed to determine skew at 806, then all of the text is skew corrected at 810. Thereafter, the skew corrected text is displayed at 812. For example, text horizontally aligned across the touchscreen is displayed.

If a user initiation is not received at 808, the then text it not modified and any text that is skewed remains skewed at 814. For example, the text will continue to be received in a skewed manner. In the illustrated example, when the text remains skewed, guidance markers are generated and displayed at 816. For example, a guidance line above and below the skewed text can be displayed to facilitate a user's input of additional text along a same skew axis. In one example, a direction of the skew is tracked, a guidance marker aligned with the direction of the skew is generated and the guidance marker is displayed in combination with the user input having the skew. As described herein, if skew correction is thereafter performed, the text is better aligned to facilitate easier skew correction along a single axis. It should be noted that the guidance markers can be displayed at any time.

Thus, in some examples, the methods 700 and 800 identify and correct skew in an automated manner to align the text on the screen for easier viewing.

Exemplary Operating Environment

Figure 9:
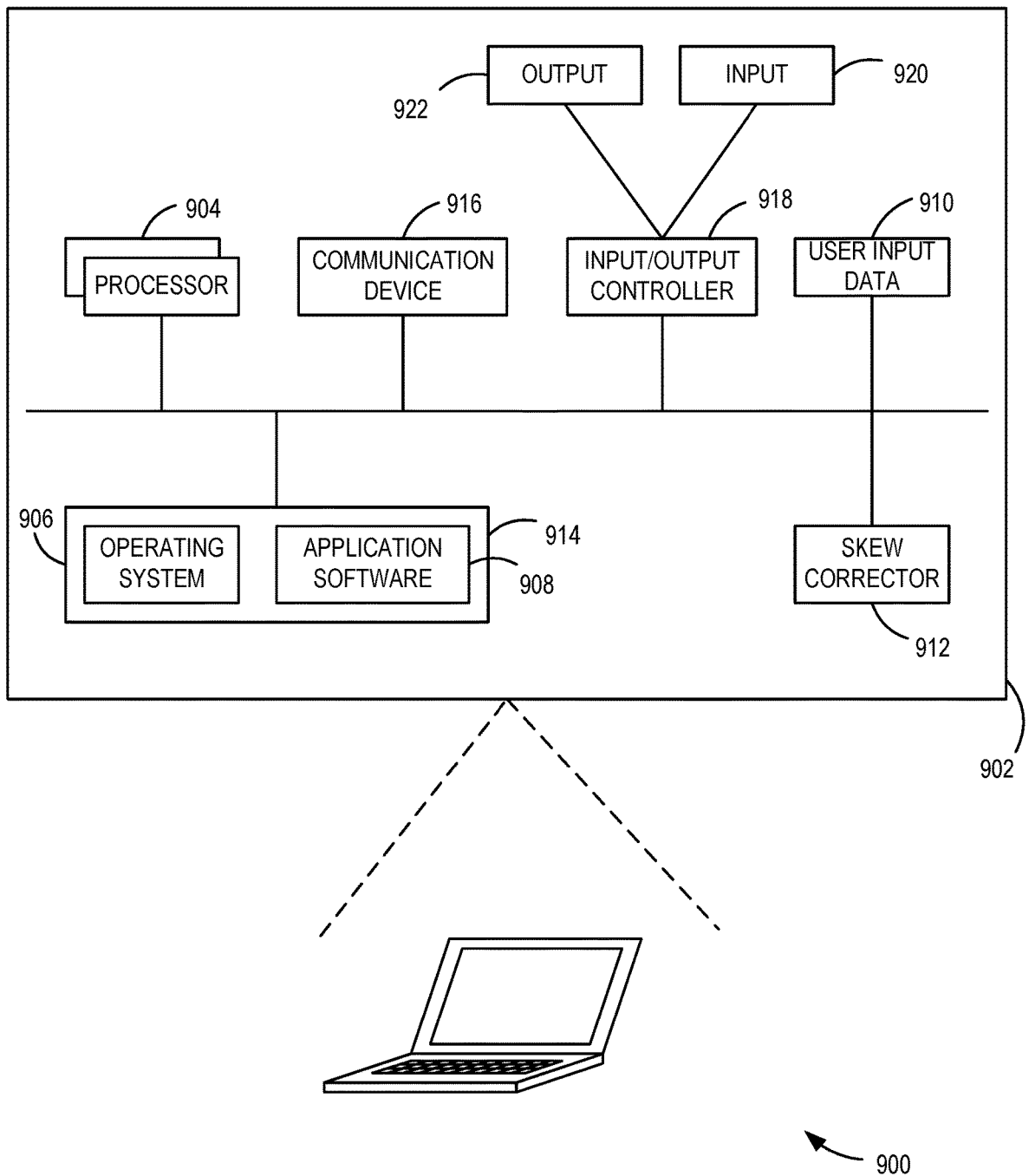
FIG. 9 illustrates a computing apparatus according to an embodiment as a functional block diagram.

The present disclosure is operable with a computing apparatus 902 according to an embodiment as a functional block diagram 900 in FIG. 9. In one example, components of the computing apparatus 902 may be implemented as a part of an electronic device according to one or more embodiments described in this specification. The computing apparatus 902 comprises one or more processors 904 which may be microprocessors, controllers or any other suitable type of processors for processing computer executable instructions to control the operation of the electronic device. Platform software comprising an operating system 906 or any other suitable platform software may be provided on the apparatus 902 to enable application software 908 to be executed on the device. According to an embodiment, user input data 910 is aligned by a skew corrector 912 and may be accomplished by software.

Computer executable instructions may be provided using any computer-readable media that are accessible by the computing apparatus 902. Computer-readable media may include, for example, computer storage media such as a memory 914 and communications media. Computer storage media, such as the memory 914, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 914) is shown within the computing apparatus 902, it will be appreciated by a person skilled in the art, that the storage may be distributed or located remotely and accessed via a network or other communication link (e.g. using a communication interface 916).

The computing apparatus 902 may comprise an input/output controller 918 configured to output information to one or more input devices 920 and output devices 922, for example a display or a speaker, which may be separate from or integral to the electronic device. The input/output controller 918 may also be configured to receive and process an input from the one or more input devices 920, for example, a keyboard, a microphone or a touchpad. In one embodiment, the output device 922 may also act as the input device 920. An example of such a device may be a touch sensitive display. The input/output controller 918 may also output data to devices other than the output device 922, e.g. a locally connected printing device. In some embodiments, a user may provide input to the input device(s) 920 and/or receive output from the output device(s) 922.

In some examples, the computing apparatus 902 detects voice input, user gestures or other user actions and provides a natural user interface (NUI). This user input may be used to author electronic ink, view content, select ink controls, play videos with electronic ink overlays and for other purposes. The input/output controller 918 outputs data to devices other than a display device in some examples, e.g. a locally connected printing device.

NUI technology enables a user to interact with the computing apparatus 902 in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence.

Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

The functionality described herein can be performed, at least in part, by one or more hardware logic components. According to an embodiment, the computing apparatus 902 is configured by the program code when executed by the processor(s) 904 to execute the embodiments of the operations and functionality described. Alternatively, or in addition, the functionality described herein can be performed, at least in part, by one or more hardware logic components. For example, and without limitation, illustrative types of hardware logic components that can be used include FPGAs, ASICs, ASSPs, SOCs, CPLDs, and GPUs.

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein.

Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Other examples include:
A system for user input alignment, the system comprising:
at least one processor; and
at least one memory comprising computer program code, the at least one memory and the computer program code configured to, with the at least one processor, cause the at least one processor to perform an automated alignment process to:
identify a skew of a user input as the user input is being received at a touchscreen display;
determine a skew correction based on the identified skew;
apply the skew correction to the user input to align the user input on the touchscreen display, the skew correction applied in an automated alignment process; and
display the user input with the applied skew correction on the touchscreen display.

Other examples include:
A computerized method for automated user input alignment, the computerized method comprising:
identifying a skew of a user input as the user input is being received at a touchscreen display;
determining a skew correction based on the identified skew;
applying the skew correction to the user input to align the user input on the touchscreen display, the skew correction applied in an automated alignment process; and
displaying the user input with the applied skew correction on the touchscreen display.

Other examples include:
One or more computer storage media having computer-executable instructions for user input alignment that, upon execution by a processor, cause the processor to at least perform an automated alignment process to:
identify a skew of a user input as the user input is being received at a touchscreen display;
determine a skew correction based on the identified skew;
apply the skew correction to the user input to align the user input on the touchscreen display, the skew correction applied in an automated alignment process; and
display the user input with the applied skew correction on the touchscreen display.

Alternatively, or in addition to the other examples described herein, examples include any combination of the following:
tracking a direction of the skew, generating a guidance marker aligned with the direction of the skew and displaying the guidance marker in combination with the user input having the skew.
wherein the user input comprises text and the skew comprises one of a tilt or a curvature of an axis of the text.
applying the skew correction using the automated alignment process by aligning the user input with a horizontal axis of the touchscreen display or a vertical axis of the touchscreen display.
receiving a user input before applying the skew correction, the user input comprising at least one of a selection of a portion of the user input to which the skew correction is to be applied or a selection of a display element to initiate the applying of the skew correction.
applying the skew correction using the automated alignment process by automatically moving the user input to one of tilt or rotate the user input on the touchscreen display.
applying the skew correction using the automated alignment process by automatically moving an application displayed on the touchscreen display by a skew amount to align the application with the user input having the skew.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for training a neural network. The illustrated one or more processors 904 together with the computer program code stored in memory 914 constitute exemplary processing means for using and/or training neural networks.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for user input alignment, the system comprising:
    at least one processor; and
    at least one memory comprising computer program code, the at least one memory and the computer program code configured to, with the at least one processor, cause the at least one processor to perform an automated alignment process to:
    identify a skew of a user input as the user input is being received at a touchscreen display;
    determine a skew correction based on the identified skew;
    apply the skew correction to the user input to align the user input on the touchscreen display, the skew correction applied in an automated alignment process by automatically moving an application displayed on the touchscreen display by a skew amount to align the application with the user input having the skew; and
    display the user input with the applied skew correction on the touchscreen display.

2. The system of claim 1, wherein the at least one memory and the computer program code are further configured to, with the at least one processor, cause the at least one processor to track a direction of the skew, generate a guidance marker aligned with the direction of the skew and display the guidance marker in combination with the user input having the skew.

3. The system of claim 1, wherein the user input comprises text and the skew comprises one of a tilt or a curvature of an axis of the text.

4. The system of claim 1, wherein the at least one memory and the computer program code are further configured to, with the at least one processor, cause the at least one processor to apply the skew correction using the automated alignment process by aligning the user input with one of a horizontal axis of the touchscreen display or a vertical axis of the touchscreen display.

5. The system of claim 1, wherein the at least one memory and the computer program code are further configured to, with the at least one processor, cause the at least one processor to receive a user input before applying the skew correction, the user input comprising at least one of a selection of a portion of the user input to which the skew correction is to be applied or a selection of a display element to initiate the applying of the skew correction.

6. The system of claim 1, wherein the at least one memory and the computer program code are further configured to, with the at least one processor, cause the at least one processor to apply the skew correction using the automated alignment process by automatically moving the user input to one of tilt or rotate the user input on the touchscreen display, wherein the user input comprises one of an active input or a passive input, including one of a pen or a finger of the user.

7. The system of claim 1, wherein the at least one memory and the computer program code are further configured to, with the at least one processor, cause the at least one processor to track a direction of the skew, generate a guidance marker aligned with the direction of the skew and display the guidance marker in combination with the user input having the skew, wherein the guidance marker comprises guidelines to align the skewed user input along a single axis corresponding to the tracked direction, the guidelines displayed above and below the user input.

8. A computerized method for automated user input alignment, the computerized method comprising:
    identifying a skew of a user input as the user input is being received at a touchscreen display;
    determining a skew correction based on the identified skew;
    applying the skew correction to the user input to align the user input on the touchscreen display using an automated alignment process by automatically moving an application displayed on the touchscreen display by a skew amount to align the application with the user input having the skew; and
    displaying the user input with the applied skew correction on the touchscreen display.

9. The computerized method of claim 8, further comprising tracking a direction of the skew, and wherein the guidance marker is removed after the user input is complete.

10. The computerized method of claim 8, wherein the user input comprises text and the skew comprises one of a tilt or a curvature of an axis of the text.

11. The computerized method of claim 8, further comprising applying the skew correction using the automated alignment process by aligning the user input with one of a horizontal axis of the touchscreen display or a vertical axis of the touchscreen display.

12. The computerized method of claim 8, receiving a user input before applying the skew correction, the user input comprising at least one of a selection of a portion of the user input to which the skew correction is to be applied or a selection of a display element to initiate the applying of the skew correction.

13. The computerized method of claim 8, further comprising applying the skew correction using the automated alignment process by automatically moving the user input to one of tilt or rotate the user input on the touchscreen display.

14. The computerized method of claim 8, further comprising tracking a direction of the skew, generating a guidance marker aligned with the direction of the skew and displaying the guidance marker in combination with the user input having the skew.

15. One or more computer storage media having computer-executable instructions for user input alignment that, upon execution by a processor, cause the processor to at least perform an automated alignment process to:
    identify a skew of a user input as the user input is being received at a touchscreen display;
    determine a skew correction based on the identified skew;
    apply the skew correction to the user input to align the user input on the touchscreen display, the skew correction applied in an automated alignment process by automatically moving an application displayed on the touchscreen display by a skew amount to align the application with the user input having the skew; and
    display the user input with the applied skew correction on the touchscreen display.

16. The one or more computer storage media of claim 15 having further computer-executable instructions that, upon execution by a processor, cause the processor to at least track a direction of the skew, generate a guidance marker aligned with the direction of the skew and display the guidance marker in combination with the user input having the skew, wherein the guidance marker becomes part of the user input.

17. The one or more computer storage media of claim 15, wherein the user input comprises text and the skew comprises one of a tilt or a curvature of an axis of the text.

18. The one or more computer storage media of claim 15 having further computer-executable instructions that, upon execution by a processor, cause the processor to at least to apply the skew correction using the automated alignment process by aligning the user input with a horizontal axis of the touchscreen display or a vertical axis of the touchscreen display.

19. The one or more computer storage media of claim 15 having further computer-executable instructions that, upon execution by a processor, cause the processor to at least receive a user input before applying the skew correction, the user input comprising at least one of a selection of a portion of the user input to which the skew correction is to be applied or a selection of a display element to initiate the applying of the skew correction.

20. The one or more computer storage media of claim 15 having further computer-executable instructions that, upon execution by a processor, cause the processor to at least apply the skew correction using the automated alignment process by automatically moving the user input to one of tilt or rotate the user input on the touchscreen display.

\* \* \* \* \*